United States Patent [19]

Hsien-Sen

[11] 4,369,574

[45] Jan. 25, 1983

[54] PEEL CONCENTRATING CLEARANCE BOX

[76] Inventor: Liao Hsien-Sen, No. 128, Pi-Shan Rd., Tsao-Tun Town, Nan-Tou Hsien, Taiwan

[21] Appl. No.: 219,523

[22] Filed: Dec. 23, 1980

[51] Int. Cl.³ .................................... A47J 17/02
[52] U.S. Cl. .................................... 30/123.5; 30/128
[58] Field of Search ............. 30/123.5, 123.6, 123.7, 30/124, 125, 128

[56] References Cited

U.S. PATENT DOCUMENTS 853,725  5/1907  Newton .................. 30/124 X
2,912,755  11/1959  Twyman .................. 30/124
3,059,273  10/1962  Blevins .................. 30/128 X Primary Examiner—Jimmy C. Peters
Attorney, Agent, or Firm—Blair, Brown & Kreten

[57] ABSTRACT

This invention relates to a kind of peel concentrating clearance box, in which a peeler is inset into the surface of a columnar box and upon paring, the peels will enter into the box along the slot of the peeler so as not to be thrown about. After the paring is finished, a top lid can be turned to open and a scrape plate follows the top lid to be pulled out and the scrape plate will empty all the peels collected in the box. This invention is not only easily operated but also can avoid a dirty situation.

6 Claims, 5 Drawing Figures

PEEL CONCENTRATING CLEARANCE BOX

BACKGROUND OF THE INVENTION

When we pare something in a conventional way, whenever a knife used, the peels are certain to be thrown about by the actions of paring. Although we can use a garbage can to contain the peels, it is still inevitable they be thrown about to cause a dirty situation. As the peels wet surfaces frequently stick to the ground and are not easy to be retrieved, it has become a problem in our ordinary life.

Aiming at overcoming the above mentioned, this invention therefore provides an effective peel concentrating clearance box to solve the said problem.

SUMMARY OF THE INVENTION

This invention relates to a kind of peel concentrating clearance box, in which a peeler with two blades is inset into a columnar box and the slot of the peeler is connected to the inside of the box. While holding the box to do the paring, the peels will enter into the box along the slot of the peeler to be collected together so as to not be thrown about by the actions of the paring. After the peels are collected together by the box, a top lid can be turned to open and a scrape plate that is set inside the box and connected with the top lid by a linkage bar will follow the top lid to be pulled out from the box to empty all the peels collected in the box. And all the operations are convenient, safe and sanitary.

DESCRIPTION OF THE PREFERRED EMBODIMENT

Figure 1:
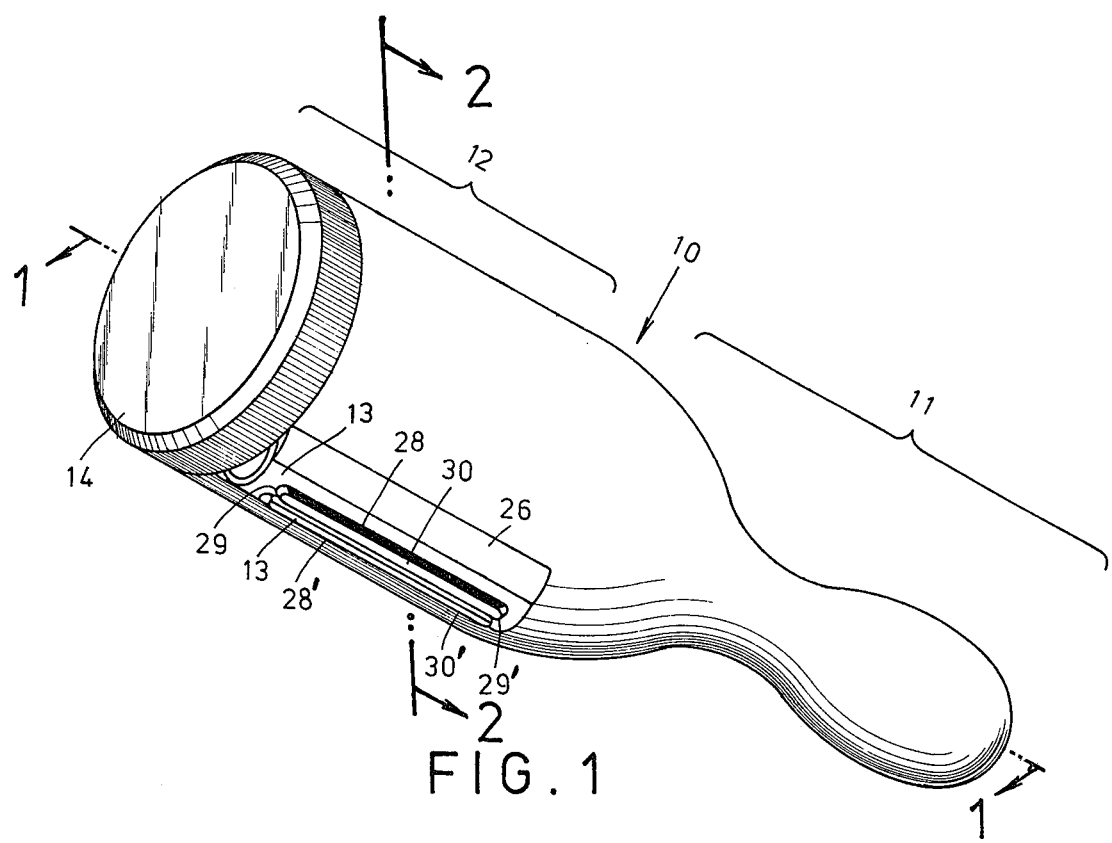
FIG. 1 is a perspective view of the bottom of the box.

As shown in FIG. 1, the clearance box 10 is composed of a handle portion 11 for one hand to hold and also a body portion 12. A peeler 13 is inset at the lower part of the body portion 12 for paring purpose and on the other end of the body portion 12 is set a top lid 14.

Figure 2:
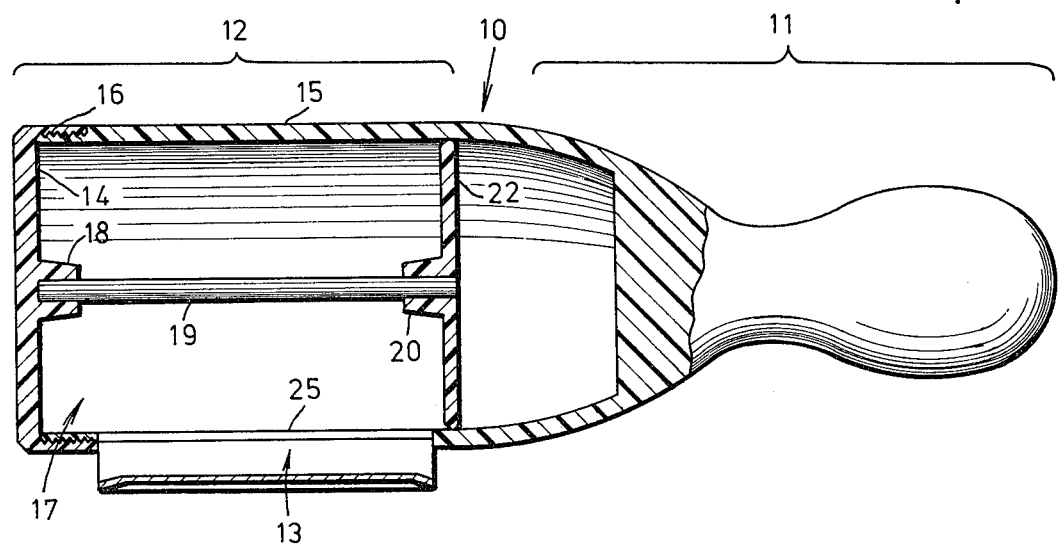
FIG. 2 is a section view on cut line 1—1 of FIG. 1.

As shown in FIG. 2, the body portion 12 of the clearance box 10 is a hollow box 15. The top lid 14 as indicated in the left side of FIG. 2 includes the spiral thread 16 to seal the opening end 17 of the box 15. A flange 18 is inside the top lid 14 and a linkage bar 19 is inset into the said flange 18. On the scrape plate 22 is also set a flange 20 and one end of the linkage bar 19 is inset into the flange 20 to connect the scrape plate 22 and the top lid 14 in order that the scrape plate 22 will follow the top lid 14 to be pulled out to empty all the peels from the box 15.

Figure 5:
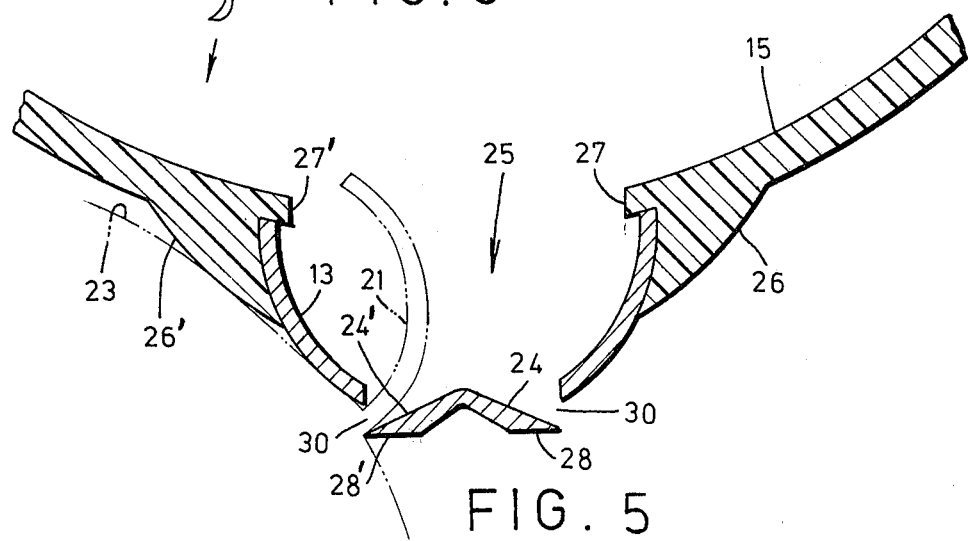
FIG. 5 is a partly enlarged section view of FIG. 1, which shows the condition when the peels are pared by the peeler.
Figure 4:
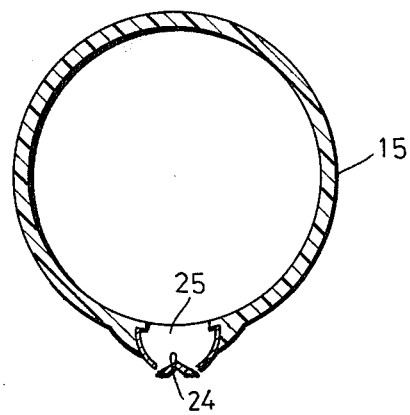
FIG. 4 is a section view on cut line 2—2 of FIG. 1, which shows the position where the peeler is set.

The peeler 13 is inset along the long hole 25 which is opposite to the box 15. Please refer to FIG. 4 and 5 accompanied by FIG. 1 and as shown in FIG. 4, the long hole 25 is set at the lower rim of the box 15 and at the two adjacent sides' outer rims of the box 15 which are opposite to the ling hole 25 each is equipped with a peeler holding portion 26 and 26'. At the inner sides of the holding portions 26 and 26' is inset a semicircular peeler 13 and the said peeler 13 define a joint holding the holding portions 26, 26' and the extension portions 27 and 27' of the box 15 to fix to the outer rim of the box 15. The thickness of the extension portions 27 and 27' must be thinner than the wall thickness of the box 15 so that when the top lid 14 is locked as shown in FIG. 2, the peeler 13 will be kept retained by the holding portions 26 and 26' along the axial direction of the box 15 and secured for safety. As shown in FIG. 5, two blades with different directions 28 and 28' are forged from the central part of the peeler 13. As shown in FIG. 1, the two ends of the blades 28 and 28' are still connected with the peeler 13 by the webs 29 and 29', but two slots 30 and 30' are formed between the blades webs 29, 29' and the peeler as shown in FIG. 5. When the handle portion 11 is held by the right hand to do the paring (please refer to FIG. 1), the peels 21 will be pared by the blade 28' and enter into the box 15 along the back 24' of the blade and through the long hole 25 to be collected together.

Figure 3:
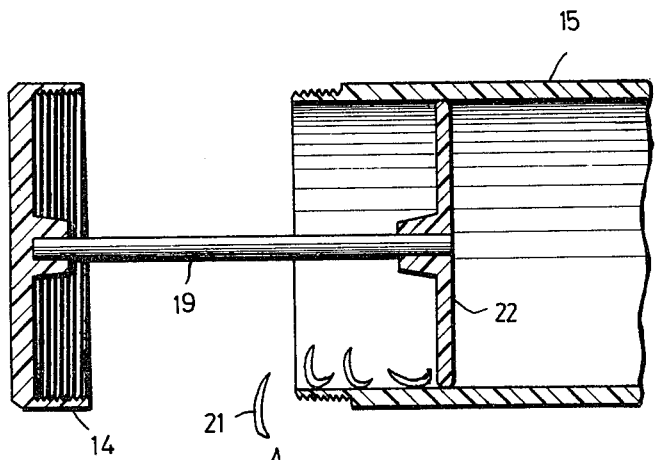
FIG. 3 is a section view on cut line 1—1 of FIG. 1, which shows the condition when the top lid is pulled out.

Please refer to FIG. 2, when the paring is finished or the peels in the box 15 are full, the top lid 14 can be turned to open and pulled out as shown in FIG. 3, then, the scrape plate 22 which is connected with the top lid 14 by a linkage bar 19 will follow the top lid to be pulled out. In the process of being pulled out, the peels 21 will be emptied from the box 15 by the scrape plate 22 and put in the garbage can.

Please refer to FIG. 1, suppose a man is used to applying his right hand for holding the handle, he can use the blade 28' to do the paring; if a man is used to applying his left hand for holding the handle, then he can use the blade 28 to do the paring.

What is claimed is:
1. A peeling device comprising in combination:
a column shaped box having a necked down handle portion at one end and a threaded lip at a remote end,
a threaded lid capping said remote end which includes an axially extending longitudinal linkage bar fastened to a scraper plate,
said scraper plate dimensioned to snugly reside within a bore defined by an interior of said box,
whereby removal of said cap translates said scraper plate to remove peels within said box,
and peeler means disposed on said box adapted to place peels therewithin.
2. The device of claim 1 wherein said peeler means includes an elongate hole on a surface of said box,
and at least one peeler blade supported at extremities by webs on said box and spaced from said hole,
whereby peelings dissociated by said blade pass into said box through said hole.
3. The device of claim 2 wherein said peeler means includes a second peeler blade integrally formed with said one peeler blade, said peeler blades together defining a substantially V-shaped cutting element in section, whereby motion in either of two directions causes peelings to be dissociated from the object being pared, and said elongate hole is adapted to receive peelings from either blade.
4. The device of claim 3 wherein said columnar box has adjacent said elongate hole a joint holding thickened portion adapted to support first and second semicircular peelers having edges communicating with said elongate hole to cooperate operatively with said first and second peeler blades whereby the peeling process is defined by both said peeler blades and said semi-circular peelers.

5. The device of claim 4 wherein said semi-circular peelers are further supported by said columnar box by marginal extension portions defining a terminus of said box.

6. The device of claim 5 wherein said linkage bar connects said scraper plate and said top lid by means of first and second flanges formed on said scraper plate and lid respectively, said linkage bar engaged at opposed extremities in each said flange.

* * * * *